United States Patent [19]

Stover

[11] 3,716,864
[45] Feb. 13, 1973

[54] ILS RECEIVER FOR AIRCRAFT WITH DISTORTION WARNING OR ELIMINATION
[75] Inventor: Harris A. Stover, Cedar Rapids, Iowa
[73] Assignee: Collins Radio Company, Cedar Rapids, Iowa
[22] Filed: March 25, 1971
[21] Appl. No.: 127,989

[52] U.S. Cl...............343/108 R, 325/472, 325/483, 343/109
[51] Int. Cl................................................G01s 1/16
[58] Field of Search...343/109, 108 R; 325/472, 477, 325/482, 483

[56] References Cited

UNITED STATES PATENTS

3,017,506  1/1962  Judy..................................325/483 X
3,308,466  3/1967  Benjamin............................343/108 R Primary Examiner—Benjamin A. Borchelt
Assistant Examiner—Richard E. Berger
Attorney—Richard W. Anderson and Robert J. Crawford

[57] ABSTRACT

Means for improving the reliability of instrument landing system receivers is disclosed. Filtering techniques detect predetermined harmonics of the basic tone-pair employed in such systems, which harmonics are present in response to heretofore undetected amplitude and frequency distortions which give rise to erroneous output guidance signals. The detection principles lead to receiver design approaches by means of which guidance signal immunity to these distortions may be realized.

19 Claims, 10 Drawing Figures

INVENTOR
HARRIS A. STOVER
BY R. W. Anderson
AGENT

FIG. 9

INVENTOR
HARRIS A. STOVER
BY R. W. Anderson
AGENT

FIG. 10

INVENTOR
HARRIS A. STOVER

ILS RECEIVER FOR AIRCRAFT WITH DISTORTION WARNING OR ELIMINATION

This invention relates to ILS receivers for aircraft and is particularly directed to ILS receivers including means for sensing and compensating for signal distortion occurring within the receiver.

As is well known, ILS systems serve to provide radio guidance for aircraft making an approach for landing. They are particularly useful under conditions, such as rain, snow, or low clouds, in which the pilot cannot see the airport. The transmitters for the ILS system are located at the airport and provide lateral guidance by means of a "localizer" antenna array positioned at the far end of the controlled runway. This array produces two antenna patterns of different tonal modulation. The left-hand one is modulated by 90 Hz, while the right-hand one is modulated by 150 Hz. For vertical guidance, a "glideslope" antenna array is positioned to one side of the controlled runway adjacent the approach end and employs 150 Hz modulation below the desired course and 90 Hz modulation above the desired course. To use this system, an aircraft carries a special radio receiver which receives these signals, compares the magnitudes of the signal modulations, and provides a visual display for the pilot. When the two "localizer" modulation signals are equal, the aircraft is headed toward the centerline of the controlled runway. When the two modulation signals from the "glideslope" are equal, the aircraft is on the desired descent path which will bring it to the approach end of the controlled runway.

Since the ILS system is intended to provide guidance for landing approaches in foul weather, it is obvious that the utmost accuracy and reliability must be provided. Unfortunately, in the receivers of the prior art, considerable monitoring has been provided to assure that the circuitry following the AM detector is operating correctly; however, no satisfactory monitoring of the overall receiving system has been provided. Therefore, certain types of distortion, which can occur within the portions of the radio preceding the AM detector and which can cause erroneous output signals, would be undetected by such prior art devices.

These disadvantages of the prior art are overcome with the present invention and means are provided making it possible to monitor the entire radio to detect and indicate the occurrence of distortion which could cause erroneous output signals. Moreover, means are provided for preventing certain types of distortion from causing erroneous output signals.

In accordance with the present invention, it has been found that signals at certain frequencies are generated at the output of the demodulator whenever distortion of signal occurs anywhere within the receiver. Thus, by monitoring these certain frequencies, it is possible to detect and indicate the occurrence of such distortion. Moreover, it has been found that the effects of both symmetrical and asymmetrical amplitude distortion occurring anywhere in the receiver can be overcome by appropriately processing the output of the AM detector.

Accordingly it is an object of the present invention to provide an improved ILS receiver.

Another object of the present invention is to provide means for detecting and indicating signal distortion occurring anywhere within an ILS receiver.

An additional object of the present invention is to provide means for overcoming the effects of amplitude distortion occurring anywhere within an ILS receiver.

A specific object of the present invention is to provide means for monitoring certain frequencies which are generated whenever signal distortion occurs anywhere within an ILS receiver, together with means for appropriately processing the output of the AM detector of an ILS receiver to overcome the effects of amplitude distortion occurring anywhere within the ILS receiver.

These and other objects and features of the present invention will be apparent from the following detailed description taken with reference to the accompanying drawings, in which.

Figure 1:
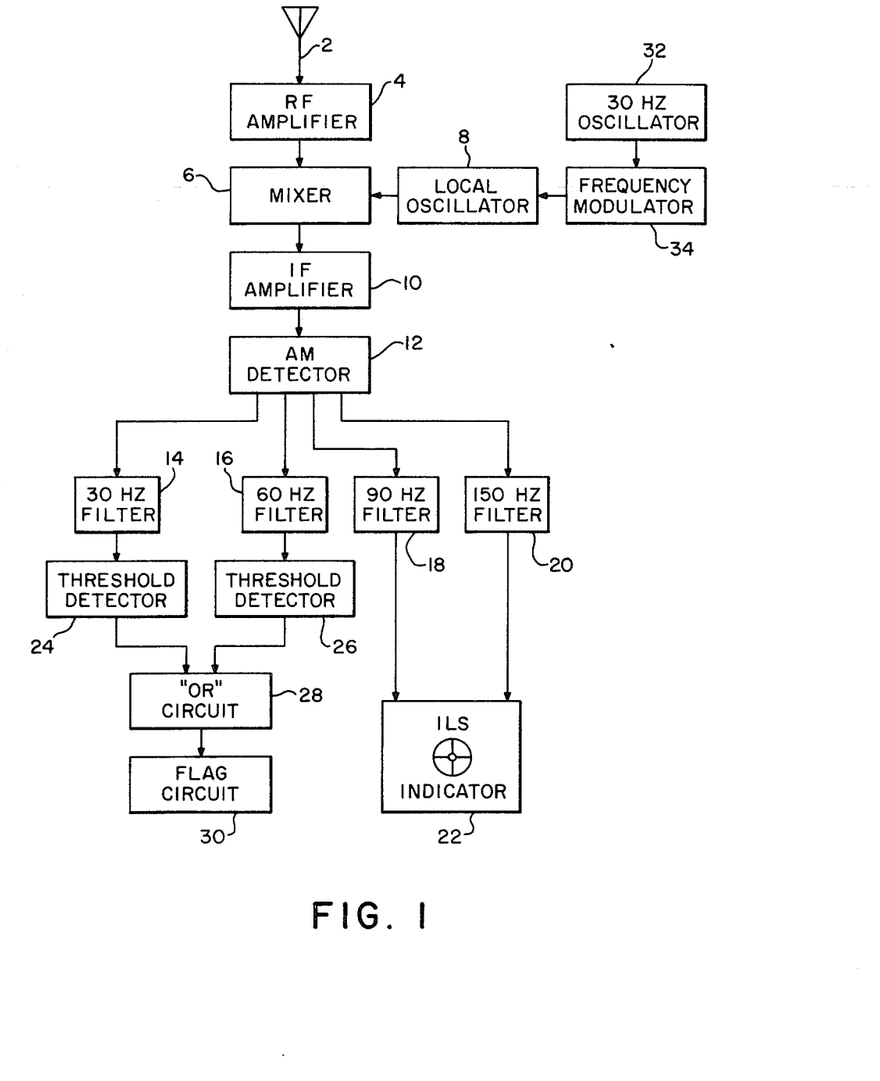
FIG. 1 is a block diagram of an ILS receiver including means, embodying the present invention, for detecting and indicating both amplitude and frequency distortion occurring anywhere within the receiver.

In that form of the present invention chosen for purposes of illustration in FIG. 1, an airborne ILS receiver is shown having an antenna 2 which receives a signal modulated at 90 Hz and 150 Hz from the ground-based transmitter and supplies this signal to an RF amplifier 4 which amplifies the signal and may, if desired, provide some degree of selectivity. The mixer 6 receives the amplified signal from RF amplifier 4 together with the output of a local oscillator 8 and combines these to provide an intermediate frequency signal. The If signal is further amplified by IF amplifier 10, which may provide additional selectivity, and is applied to the AM detector 12 for demodulation. The demodulated tones are applied to a series of filters 14, 16, 18, and 20, which provide outputs at 30 Hz, 60 Hz, 90 Hz, and 150 Hz, respectively. The 90 Hz and 150 Hz outputs from filters 18 and 20 are applied to an ILS indicator 22 to provide the conventional guidance information. Meanwhile the 30 Hz output from filter 14 and the 60 Hz output from filter 16 are supplied, respectively, to threshold circuits 24 and 26 and, thence, through OR circuit 28 to flag circuit 30 or other suitable means for warning the pilot of an erroneous signal. For reasons which will be discussed below, it may be desirable to provide a 30 Hz oscillator 32 which supplies a signal to frequency modulator 34 to impress a 30 Hz frequency modulation on the output of the local oscillator 8.

The operation of the ILS receiver of FIG. 1 can best be understood by considering the types of distortion that can occur and which may cause erroneous guidance information to be displayed by the ILS indicator 22. Two types of distortion, amplitude distortion and frequency distortion, will cover nearly all situations. Amplitude distortion is frequently caused by component failures or value changes which limit the maximum amplitude that can be passed by a device, such as an amplifier. If such limiting takes place in any of the circuitry between antenna 2 and the AM detector 12, it will cause asymmetrical limiting which effects only the positive peaks of the waveform, since the negative modulation peaks are at the lowest signal level. In contrast, distortion occurring in or after the AM detector 12 may result in symmetrical limiting which effects both the positive and negative peaks equally.

It can be shown that either symmetrical or asymmetrical limiting can cause amplitude changes of the 90 Hz and 150 Hz modulation signals which will produce erroneous guidance information. In accordance with the present invention, it has been found that this limiting, both symmetrical and asymmetrical, serves to produce a signal component at 30 Hz and odd harmonics thereof. It can further be shown that asymmetrical limiting also produces signal components at the even harmonics of 30 Hz while symmetrical limiting does not produce even harmonics. Thus the odd harmonic filter, which detects both types of amplitude limiting is embodied as a 30 Hz filter in FIG. 1. As seen in FIG. 1, filter 14 serves to monitor the 30 Hz output of AM detector 12. Threshold detector 24 determines when the magnitude of the 30 Hz output exceeds a predetermined value and, if this occurs, passes a signal through OR circuit 28 to cause flag circuit 30 to provide a warning that the guidance data displayed by ILS indicator 22 is erroneous.

Frequency distortion occurs when different frequencies within the operating range of the equipment are amplified by different amounts or have different time delays. It has been found that this type of distortion can be detected by frequency modulating the local oscillator 8 at a predetermined frequency, as by 30 Hz oscillator 32 and frequency modulator 34. When this is done, the signal input to the AM detector 12 will be modulated in amplitude as well as frequency if the amplitude response of the ILS receiver is not constant within the frequency range of the modulation. Thus, if the response of the receiver is asymmetrical about the frequency corresponding to the unmodulated frequency of the local oscillator 8, the output of AM detector 12 will have a component at the 30 Hz predetermined frequency impressed on the local oscillator 8 by oscillator 32 and frequency modulator 34. If the amplitude response of the receiver is symmetrical with frequency, but not uniform, about the frequency corresponding to the unmodulated frequency of the local oscillator 8, the output of AM detector 12 will have a component at 60 Hz or twice the predetermined frequency imposed on the local oscillator 8 by oscillator 32 and frequency modulator 34. In order to detect such distortion, filter 14 serves to monitor the output of AM detector 12 for the 30 Hz predetermined frequency signal of oscillator 32, while filter 16 is provided to monitor the output of AM detector 12 for the 60 Hz signal at twice the predetermined frequency of oscillator 32. Threshold detectors 24 and 26 determine whether the signals monitored by the respective filters 14 and 16 exceed a predetermined value and, if so, supply a signal through OR circuit 28 to cause flag circuit 30 to provide an appropriate warning.

It will be apparent that the frequency distortion monitoring operation described above may be performed at frequencies other than the 30 Hz value ascribed herein to oscillator 32, so long as filters, such as 14 and 16, are provided to monitor signals at the frequency employed to modulated the local oscillator ($\omega_m$) and at twice that frequency ($2\omega_m$). However, since signals at 30 Hz are generated by amplitude distortion, as discussed above, it is obviously convenient to employ this value for monitoring frequency distortion as well.

Figure 2:
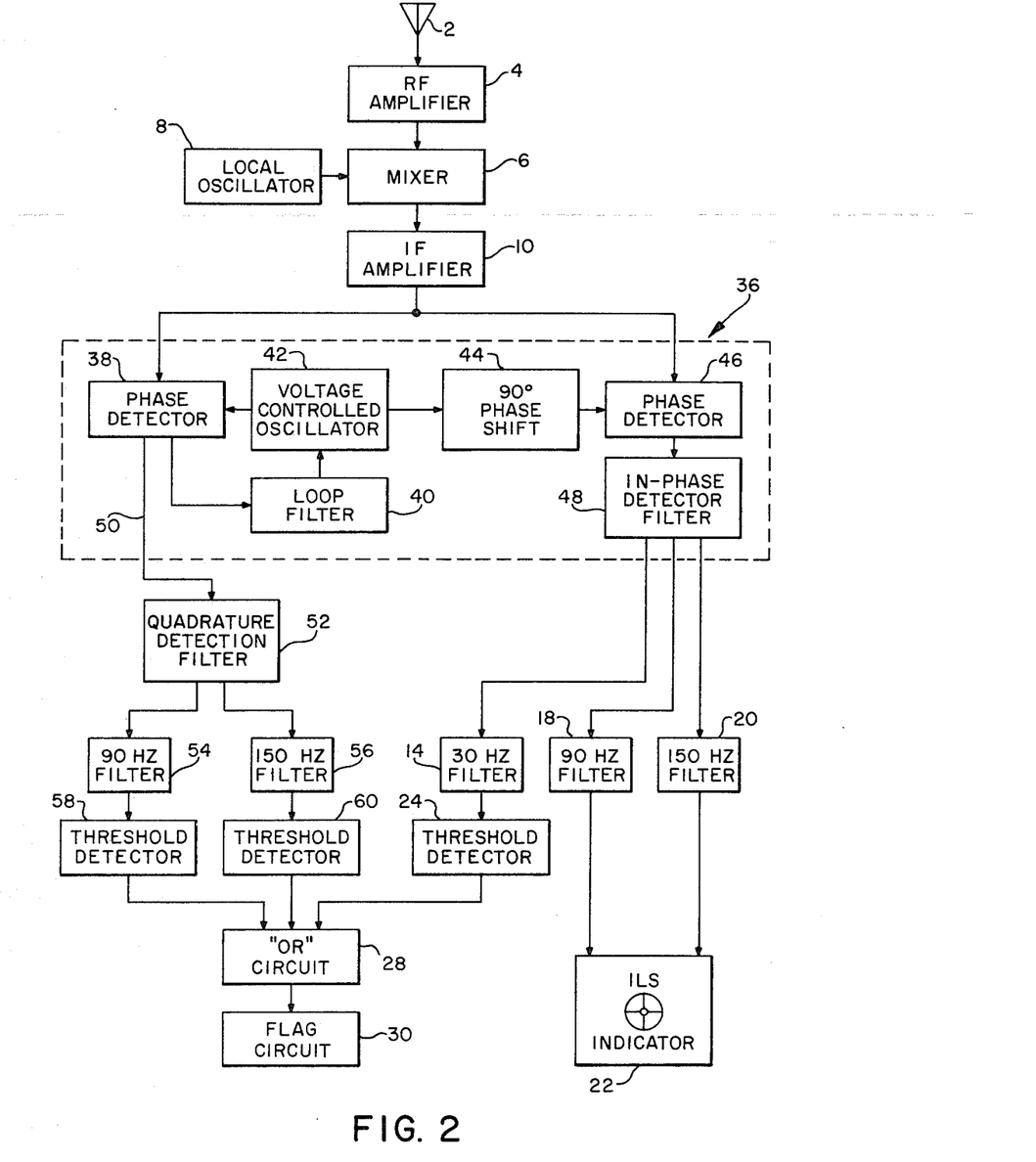
FIG. 2 is a block diagram of an ILS receiver including means, embodying an alternative form of the present invention, for detecting and indicating frequency distortion.

FIG. 2 illustrates an alternative form of the ILS receiver of FIG. 1 which permits monitoring frequency distortion without frequency modulating the local oscillator 8. This is accomplished by replacing the AM detector 12 of FIG. 1 with a synchronous detector, indicated generally as 36 in FIG. 2, which is capable of detecting both in-phase and quadrature components of the 90 Hz and 150 Hz signals. As shown, the signal with 90 Hz and 150 Hz modulations is picked up by antenna 2 and amplified by RF amplifier 4 which may, if desired, apply some selectivity. Mixer 6 receives the amplified signal from RF amplifier 4 and combines it with the output of local oscillator 8 to provide an intermediate frequency signal which is passed to IF amplifier 10 for further amplification. From the IF amplifier 10, the signal is passed to the phase-locked loop consisting of phase detector 38, loop filter 40, and oscillator 42 to lock oscillator 42 90° out of phase with the carrier component of the received signal as it appears at the input to phase detector 38. The output of oscillator 42 is subjected to a ninety degree phase shift by phase shifter 44 and is applied to phase detector 46, as a carrier reference, to provide synchronous AM detection of the in-phase component of the modulation. The output of phase detector 46 may, if desired, be passed through a low pass filter 48 and is applied to filters 14, 18, and 20. Filters 18 and 20 serve to pass the 90 Hz and 150 Hz signals, respectively, to the ILS indicator 22 to provide the desired guidance information; while filter 14 and threshold detector 24 monitor the 30 Hz to detect amplitude distortion, as discussed above, and, if necessary, apply a signal through OR circuit 28 to actuate the flag circuit 30.

With a properly operating system, the 90 Hz and 150 Hz signals will appear only at the output of phase detector 46. However, it can be shown that, where frequency distortion occurs, there will nearly always be quadrature modulation components which will appear on output 50 of phase detector 38. The quadrature output 50 may, if desired, be passed through a low pass filter 52 and, in any event, is applied to 90 Hz filter 54 and 150 Hz filter 56. Threshold detectors 58 and 60 serve to monitor the signals passed by the filters 54 and 56, respectively; and, if these signals exceed a predetermined magnitude, apply a signal through OR circuit 28 to actuate the flag circuit 30.

In accordance with a first objective of the present invention means have been provided for detecting and annunciating the existence of both symmetrical and asymmetrical limiting in ILS receivers as well as means for detecting and annunciating frequency distortion in ILS receivers. As previously discussed, a bandpass filter at 240 Hz (even harmonic of 30 Hz) followed by a threshold detector to determine the presence of a component at 240 Hz in the demodulated AM signal might be used to detect asymmetrical limiting but would not detect symmetrical limiting; thus, an odd harmonic of the basic 30 Hz signal in the system was chosen since it would detect both symmetrical and asymmetrical limiting. The filter output, in being indicative of amplitude distortions present in the receiver which gave rise to erroneous indications on the ILS indicator, was utilized by a flag circuit to annunciate receiver inoperability.

In accordance with a further objective of the present invention methods will be described by means of which an ILS receiver may be modified so as to avoid indication errors stemming from amplitude limiting. The modifications to be described provide a significant advantage in that the effects of amplitude distortions are avoided rather than being annunciated and, thus, continued use of the receiver is permitted.

A first method to be discussed permits an ILS receiver to handle symmetrically limited signals without error such that only asymmetrical limiting and frequency distortion need be monitored. A second method to be discussed permits an ILS receiver to handle either symmetrical or asymmetrical limiting without indication error, such that only frequency distortion need be monitored to completely check the receiver operation. In either of the methods to be discussed only the method of handling amplitude distortion is provided. A receiver so modified may then if desired be provided with the previously discussed frequency distortion detection means to provide an improved ILS receiver.

Figure 3:
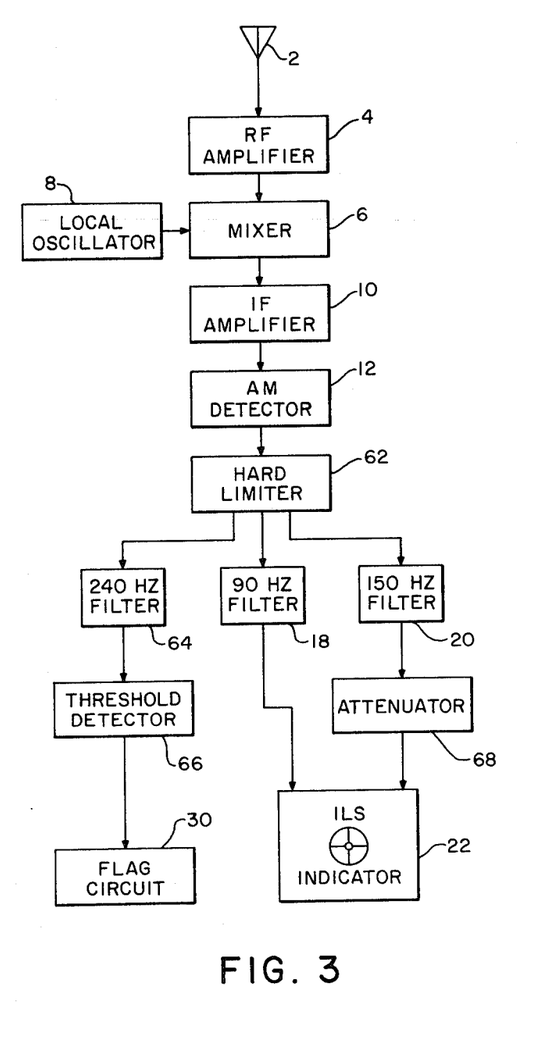
FIG. 3 is a block diagram of an ILS receiver including means, embodying an alternative form of the present invention, overcoming the effects of symmetrical amplitude distortion.

FIG. 3 illustrates a further alternative form of the ILS receiver of FIG. 1 by means of which the receiver is rendered immune to errors stemming from symmetrical limiting and provided with monitoring means to detect the presence of asymmetrical limiting for flag annunciation.

As shown in FIG. 3, the signal received on antenna 2 is applied to RF amplifier 11. Mixer 6 receives the amplified signal from RF amplifier 4 and combines it with the output of local oscillator 8 to provide an intermediate frequency signal which is passed to RF amplifier 10. The output from RF amplifier 10 is applied to AM detector 12 which detects the 90 Hz and 150 Hz tones. The output from detector 12 is applied to a hard limiter 62, a device which provides either a positive or a negative output of given level depending upon whether the signal applied thereto is above or below the mean value of the applied signal. Thus, for a signal with zero mean, the output of hard limiter 62 is a constant positive voltage of a given level whenever the input signal applied to the hard limiter is positive. Conversely, the output from hard limiter 62 is a constant negative voltage of a given level whenever the input to the hard limiter is negative. The output of hard limiter 62 is applied to a 240 Hz filter 64, a 90 Hz filter 18, and a 150 Hz filter 20. The output from 240 Hz filter 64 is applied to a threshold detector 66 the output of which is supplied to a flag circuit 30 to annunciate the presence of asymmetrical limiting in the system. The outputs from the 90 Hz filter 18 and 150 Hz filter 20 are applied to the ILS indicator 22, with the output from 150 Hz filter 20 being attenuated by attenuator 68 prior to application to the indicator. As will be further discussed, the system of FIG. 3 is immune to indicator errors stemming from symmetrical clipping within the system and provides annunciation as concerns asymmetrical clipping.

Since the output of hard limiter 62 of FIG. 3 utilizes only the zero crossings of the input signal, that is, only the points where the input signal crosses its own mean, the effects of symmetrical limiting are completely eliminated. Attenuator 68 is included to compensate for the effect of adding the hard limiter, which effect is as follows.

With the assumption that the output of hard limiter 62 is either $\pm\pi$ volts depending upon whether the input (assuming zero mean) is either positive or negative, Table 1 shows the levels of the 90 Hz and 150 Hz signals at the output of the hard limiter for different ratios of the 150 Hz to the 90 Hz signals at the input of the hard limiter.

TABLE 1

| Ratio of 150 Hz/90 Hz at Input to Hard Limiter | Magnitude of 90 Hz at output of Hard Limiter | Magnitude of 150 Hz at Output of Hard Limiter |
|---|---|---|
| 0.7 | 3.5399 | 1.0956 |
| 0.8 | 2.7661 | 2.1975 |
| 0.9 | 2.4198 | 2.6065 |
| 1.0 | 2.1508 | 2.8905 |
| 1.1 | 1.9360 | 3.0956 |
| 1.2 | 1.7605 | 3.2485 |
| 1.3 | 1.6144 | 3.3656 |
| 1.4 | 1.4909 | 3.4572 |

Table 2 shows the ration of the 150 Hz/90 Hz signals at the output of the hard limiter for different ratios in the input and also shows the ratio after the 150 Hz signal is passed through attenuator 68.

TABLE 2

| Ratio of 150 Hz/90 Hz at Input of Hard Limiter | Ratio of 150 Hz/90 Hz at Output of Hard Limiter | Ratio of 150 Hz/90 Hz after Attenuator |
|---|---|---|
| 0.7 | .3095 | .2303 |
| 0.8 | .7944 | .5912 |
| 0.9 | 1.0772 | .8015 |
| 1.0 | 1.3439 | 1.0000 |
| 1.1 | 1.5990 | 1.1898 |
| 1.2 | 1.8453 | 1.3731 |
| 1.3 | 2.0848 | 1.5513 |
| 1.4 | 2.3189 | 1.7255 |

With reference to Table 2, it is noted that a ratio of 1.0 at the input of the hard limiter becomes a greater ratio at the output of the limiter and after attenuation of the 150 Hz signal by attenuator 68, the ratio is corrected. If one were to plot the information in Table 2, it would be apparent that the system of FIG. 3 employing the hard limiter is actually more sensitive to an offcourse condition than the ILS system without the hard limiter inclusion. Compensation for this effect might be obtained by the inclusion of an attenuator or attenuators in the instrumentation portion of the receiver (not illustrated). For example, the sensitivity of the indicator itself might be reduced to provide the required compensation or an attenuator in the signal line feeding the indicator could produce a similar result.

The 90 Hz and 150 Hz signals applied to indicator 22 are unaffected by symmetrical limiting which may be present in the system. Detection of an even harmonic of the basic 30 Hz signal in the system, as by 240 Hz filter 64, permits a means for detecting and annunciating the presence of asymmetrical limiting. The inclusion of hard limiter 62 does not compensate for asymmetrical limiting. As previously discussed, asymmetrical limiting is that which may produce an asymmetrical wave from the normal symmetrical input wave and might include limiting in an RF or IF amplifier prior to AM detection in the system. Employment of an even harmonic filter such as filter 64 is included in the system of FIG. 3 since this filter is sensitive only to asymmetrical limiting.

Thus the system of FIG. 3 provides system immunity to symmetrical limiting with means for detecting the presence of asymmetrical limiting to provide, in accordance with the present invention, a further method of avoiding erroneous indications. The method has the significant advantage of continuing to provide an error-free signal in the presence of symmetrical limiting and thus only asymmetrical limiting need be detected. The system of FIG. 3 permits continued use of the receiver in the presence of symmetrical limiting whereas the previously disclosed detection approach, in the presence of either asymmetrical or symmetrical limiting, required that use of the receiver be discontinued.

Figure 7:
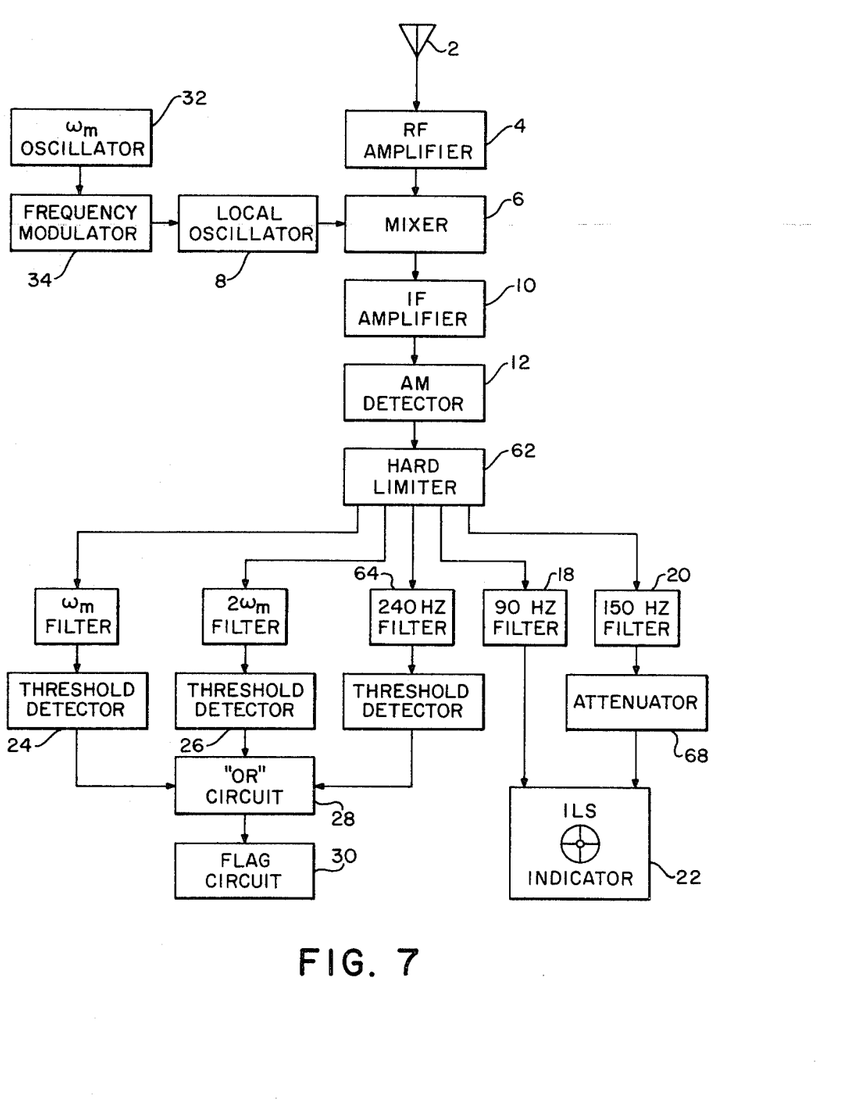
FIGS. 7–10 are block diagrams of still further alternative forms of the ILS receiver, embodying the present invention, for including frequency distortion detection means with the amplitude distortion immune systems of FIGS. 3 and 4.
Figure 8:
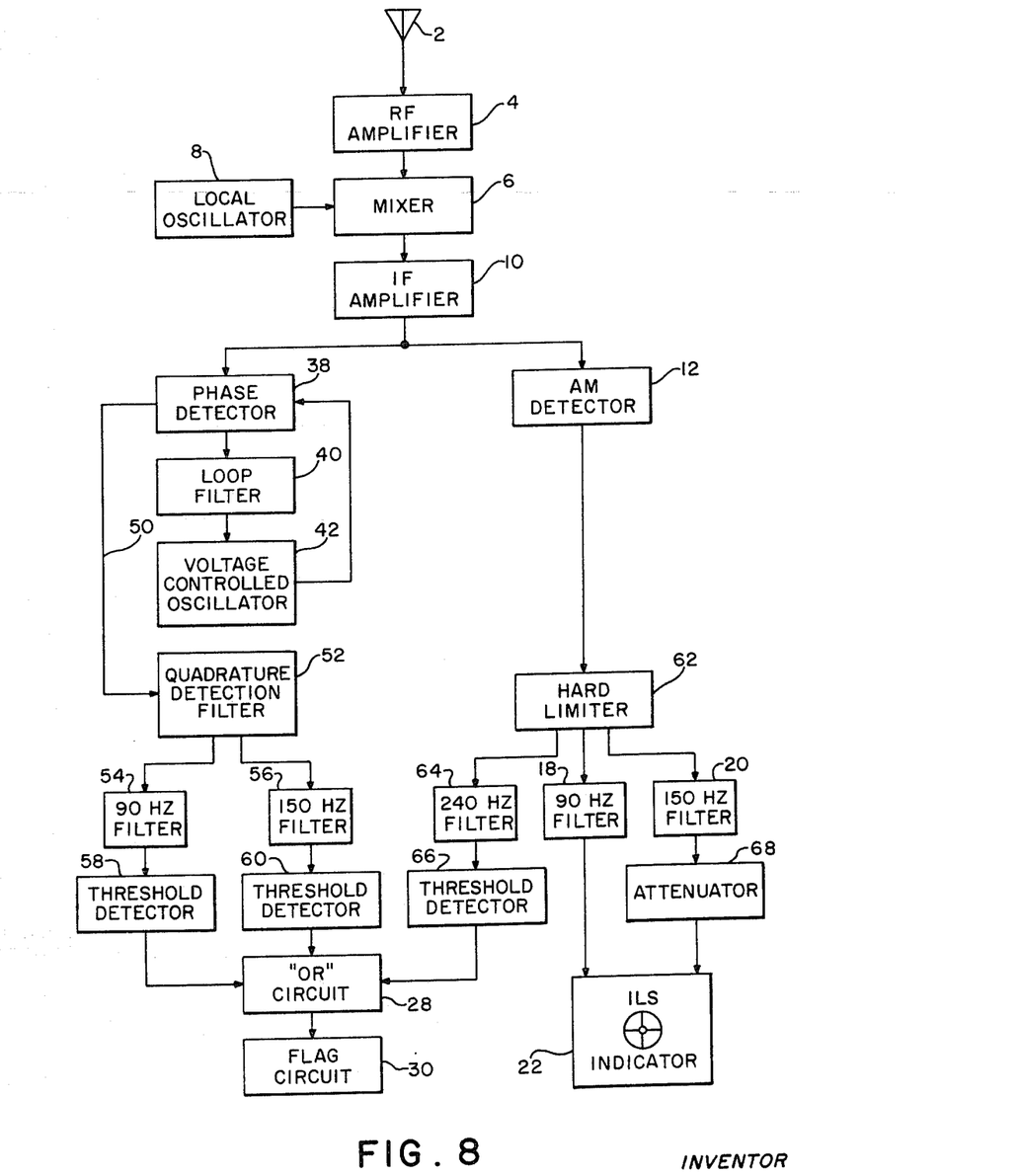

It should be emphasized that either of the frequency distortion detecting and annunciating methods of the systems of FIG. 1 and FIG. 2 might be combined with the modified receiver of FIG. 3 to completely check receiver operation. For example, as shown in FIG. 7, the local oscillator 8 of FIG. 3 might be frequency modulated as in the system of FIG. 1 by modulating frequency $\omega_M$ and filters be provided at the output of hard limiter 62 to detect the presence of $\omega_M$ and $2\omega_M$ as per FIG. 1 to provide annunciation means for the presence of frequency distortion in the system. Alternatively, as shown in FIG. 8, the system of FIG. 3 might be provided with a phase detection of the IF amplifier output as by the closed loop arrangement of FIG. 2 and quadrature detection filter means employed to effect an annunciation of the presence of frequency distortion in the system.

Figure 4:
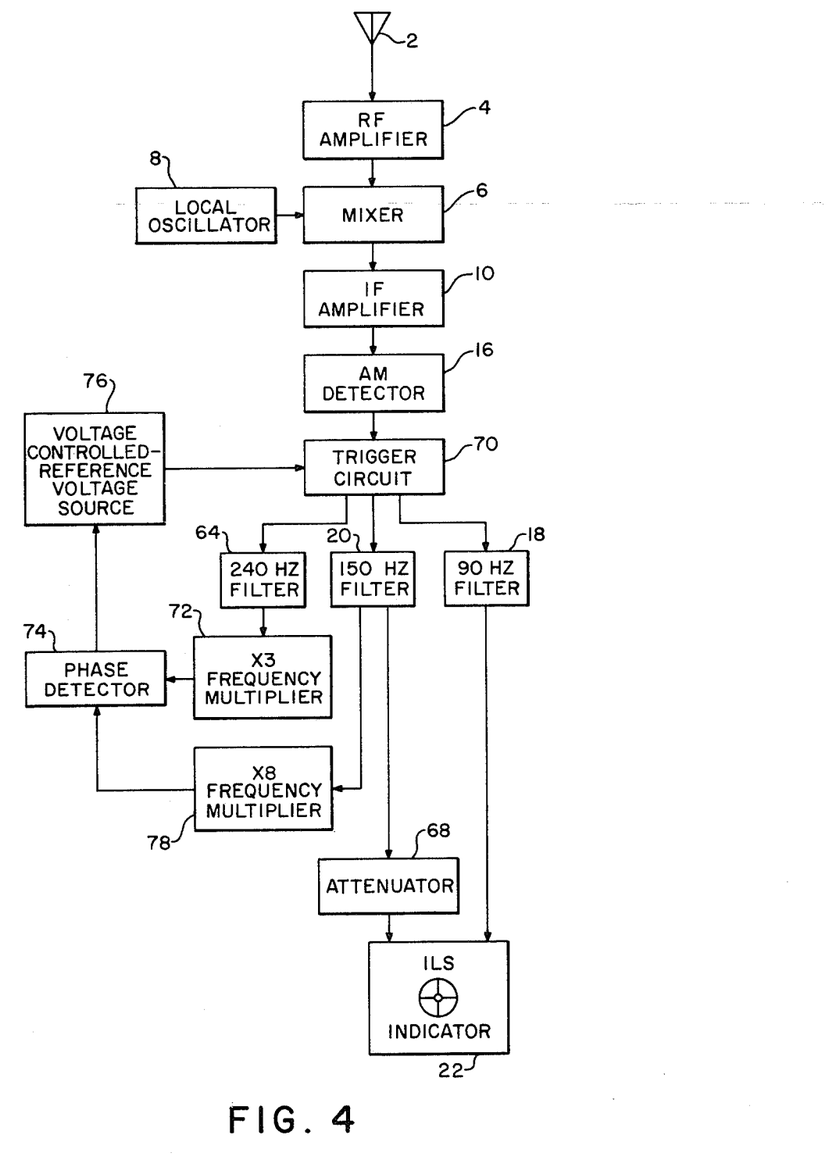
FIG. 4 is a block diagram of a further alternative form of the ILS receiver of FIG. 1 including means, embodying the present invention, for overcoming the effects of both symmetrical and asymmetrical amplitude distortion.

FIG. 4 illustrates a further embodiment of an improved ILS receiver in accordance with the present invention wherein the system is provided with immunity from distortions stemming from either symmetrical or asymmetrical limiting. The operational principle of the system of FIG. 4 stems from an analysis as to the effects of asymmetrical or non-linear limiting on the relative magnitude and ratios of certain frequency components present in the output of the AM detector of the receiver.

Figure 5:
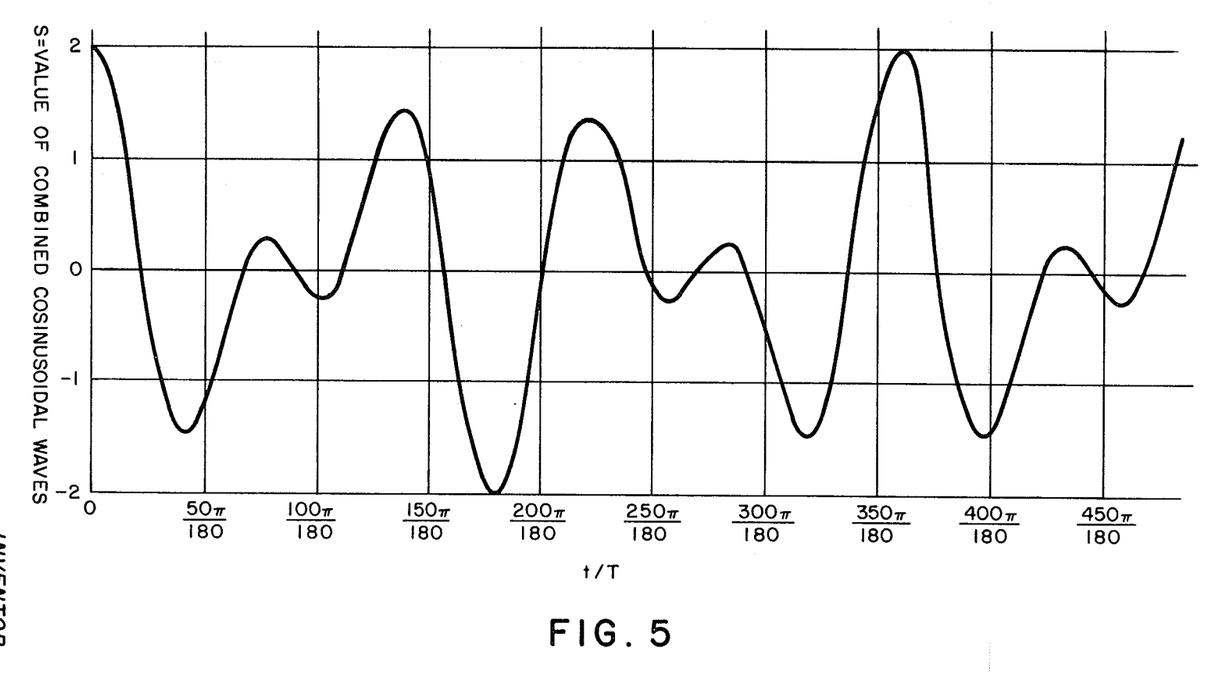
FIG. 5 is a characteristic waveform of received undistorted equal amplitude modulations.

Table 3 is generated from an assumption that 90 Hz and 150 Hz sine waves of equal amplitude are utilized as an input signal but, due to some non-linear limiting in the system, the zero crossings are not at the mean of the original undistorted wave. An original undistorted wave, as depicted in FIG. 5, is assumed, where the peaks of each of the original 90 Hz and 150 Hz sine waves are 1, giving an overall peak of 2. Table 3 data defines a hypothetical unsymmetrical wave obtained from taking the original undistorted wave and making a decision of hard limiter output of $+\pi$ or $-\pi$ based upon whether the signal is above or below some particular level which may be different than the mean value of the original undistorted wave. An unsymmetrical wave resulting from some unsymmetrical amplitude response nonlinearities prior to a hard limiter would have a similar result, i.e., could cause the hard limiter to switch from $+$ to $-$ at a level corresponding to a different level than the mean of the original undistorted wave. The left-hand column of Table 3 represents levels at which zero crossing is assumed to occur. The columns labeled 60 Hz, 90 Hz, 150 Hz, and 240 Hz represent magnitudes of the components at each of these frequencies as they appear in the output of the hard limiter for the different threshold levels.

TABLE 3

| Level | | 90 Hz | 160 Hz | 240 Hz |
|---|---|---|---|---|
| −0.1 | −.316 | 2.179 | 2.833 | −.172 |
| 0 | 0 | 2.151 | 2.891 | 0 |
| 0.1 | .316 | 2.179 | 2.833 | .172 |
| 0.2 | .697 | 2.287 | 2.627 | .362 |
| 0.3 | 1.399 | 2.637 | 2.025 | .630 |
| 0.4 | 1.375 | 2.528 | 2.061 | .803 |
| 0.5 | 1.346 | 2.417 | 2.079 | .956 |
| 0.6 | 1.310 | 2.305 | 2.078 | 1.089 |
| 0.7 | 1.269 | 2.188 | 2.058 | 1.201 |
| 0.8 | 1.225 | 2.066 | 2.019 | 1.286 |

Figure 6:
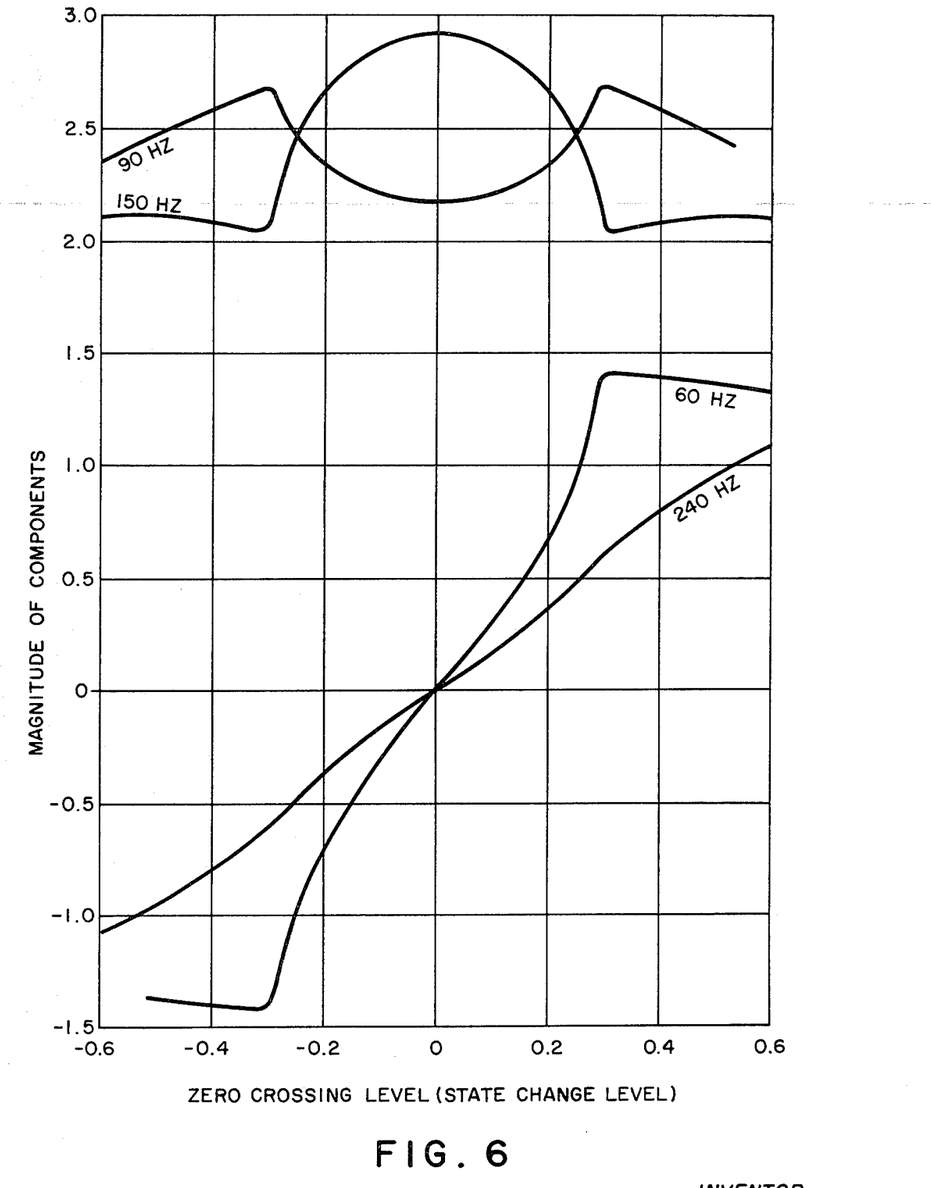
FIG. 6 has graphs showing relative amplitudes of particular frequency components for different adjustments of a hard limiter.

From the plot of the Table 3 data shown in FIG. 6, it is observed that the ratio between the 90 Hz and the 150 Hz components changes when the level is changed from the mean of the original symmetrical signal, that is, the level is changed from the zero mean. This situation can occur if the symmetrical signal, as depicted in FIG. 5, undergoes any asymmetrical limiting prior to application to the hard limiter, and is also the reason for including in FIG. 3 the 240 Hz or 60 Hz filter 64 followed by the threshold detector 66 to annunciate the presence of asymmetrical clipping. Symmetrical clipping establishes zero crossings which are always at the mean value of the original symmetric signal. Under these conditions there will be no 60 Hz or 240 Hz components in the output of the hard limiter 62 of FIG. 3.

With further reference to Table 3, it should be noted that although only one negative zero-crossing level is included in the table, the magnitude of the various components is the same whether the zero crossing is displaced positively or negatively from the mean of the original symmetrical signal. The data of Table 3 is plotted in FIG. 6 symmetrically about zero crossing level. Now, bearing in mind that the signal components are applied to a hard limiter the output of which is a predetermined level either positive or negative depending upon whether the signal applied thereto is above or below the mean of the applied signal, it is noted that the phase of the 90 Hz and 150 Hz components from the hard limiter are independent of whether the zero crossings are above or below the original mean. This is indicated in FIG. 6 by the magnitudes of the 90 Hz and 150 Hz components being positive throughout ranges of zero crossings both negative and positive. Note, however, that the 60 Hz and 240 Hz signals experience a reversal in phase depending upon whether the zero crossings are above or below the zero mean of the original symmetrical wave. It is noted that positive zero-crossing levels establish positive 60 Hz and 240 Hz components, while negative zero-crossing levels establish negative 60 Hz and 240 Hz components. Thus, the phase of the 60 Hz or 240 Hz signal component as it appears in the output of the hard limiter (the latter responding only to zero-crossings) reverses as the mean of the applied signal goes through zero from one polarity to the other. This phase reversal of the 60 Hz and 240 Hz components, coupled with the fixed phase of the 90 Hz and 150 Hz components, establishes the possibility of controlling the zero-crossing level so that it will always be at the mean of the original undistorted symmetrical wave, that is, so that it will be at zero. If this is done, asymmetrical limiting of the signal as it is applied to the hard limiter, will not give rise to distortion, since the zero-crossing level would be controlled at the mean of the original symmetrical wave. Utilizing this zero-crossing level control, FIG. 4 illustrates a modification of the ILS receiver such that it will be insensitive to limiting whether that limiting is symmetrical or asymmetrical.

In FIG. 4 antenna 2, RF amplifier 4, mixer 6, local oscillator 8, IF amplifier 10, and AM detector 16 perform the normal functions of these circuits in a superheterodyne AM receiver. The output from AM detector 16 is applied to a trigger circuit 70 which, as will be further described, performs a function similar to the hard limiter of the FIG. 3 embodiment. However, in the system of FIG. 4 the input level at which the decision is made to change the state of the output is provided, not by the mean of the applied signal, but by a voltage controlled reference voltage source 76 which may be varied by its input voltage. The method of determining the controlling input voltage to the voltage controlled reference voltage source 76 will be further discussed. Assume that the output voltage from reference source 76 is of the correct value to cause the trigger circuits 70 to change state whenever the voltage from AM detector 18 crosses the value corresponding to the mean of the original symmetrical wave. Then, assuming that the attenuator 68 on the output of 150 Hz filter 20 is adjusted to provide an output equal to the output from the 90 Hz filter 18 when the 90 Hz and 150 Hz signal components of the original signal are equal (a unity ratio), then the system will operate without error. In order for this function to be a reality it is necessary for the reference voltage from reference source 76 to be adjusted so that trigger circuit 70 will change state at the proper time. When a switching occurs at the proper time, there will be no output from the 240 Hz filter 64 to which the output from the trigger circuit is applied. The output from 240 Hz filter 64 is applied to a frequency multiplier 72 the output of which is a 1,200 Hz signal for application as a first input to a phase detector 74. The output from the 150 Hz filter 20 is applied to a further frequency multiplier 78 to provide a second 1,200 Hz signal for application to phase detector 74.

If the switching point determined by the voltage controlled reference source 76 is at any moment below the mean of the original symmetrical signal, the two inputs to phase detector 74 will be opposite in phase and a negative output will be developed from phase detector 74 for application to the controlled reference source. If the switching point determined by the reference source 76 is above the mean of the original symmetrical signal at any time, the two inputs to phase detector 74 will have the same phase and detector 74 will develop a positive output for application to the reference source 76. This, as above discussed, is evident from FIG. 6 which illustrates that the 240 Hz signal reverses phase as the mean of the applied signal shifts between positive and negative. Thus, when the 150 Hz and 240 Hz signal components from filters 20 and 64 are multiplied, the outputs of the respective multipliers bear the same relative phase relationships and it is seen that the output from phase detector 74 is a signal by means of which the trigger circuit 70 may be controlled such that its zero crossing level (the point at which it changes state) will always be at the mean of the original symmetrical wave.

Further referring to FIG. 4, a negative output from phase detector 74 might be used to increase the voltage output from voltage controlled reference voltage source 76, and a positive output from phase detector 74 might be used to decrease the voltage from the reference source 76. The output from the source 76 will then be driven to the point between in-phase voltages from 240 Hz filter 64, which is the point where there is no output from trigger circuit 70 at the 240 Hz frequency. This, then, is the correct point for satisfactory operation of the system. This is true whether or not symmetrical or asymmetrical limiting occurs prior to the trigger circuit 70.

Figure 9:
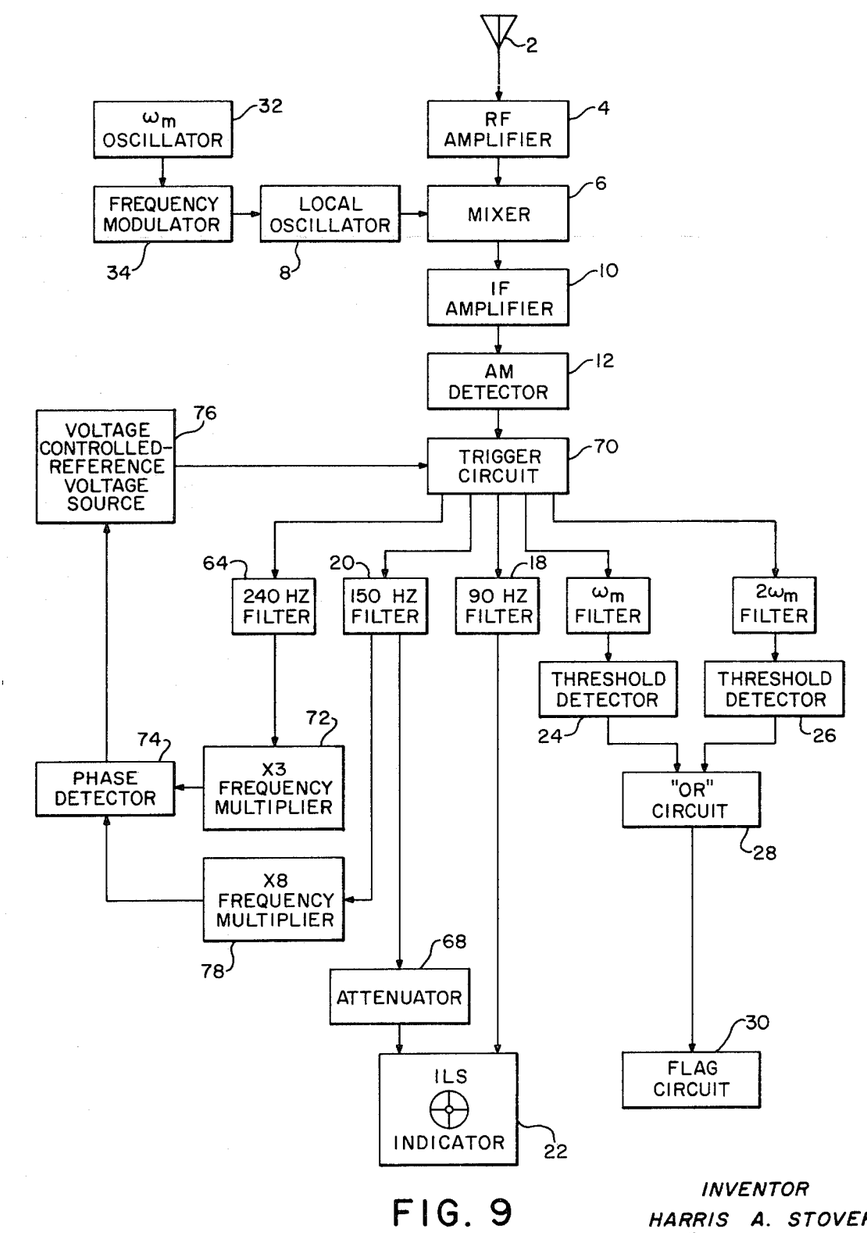
Figure 10:
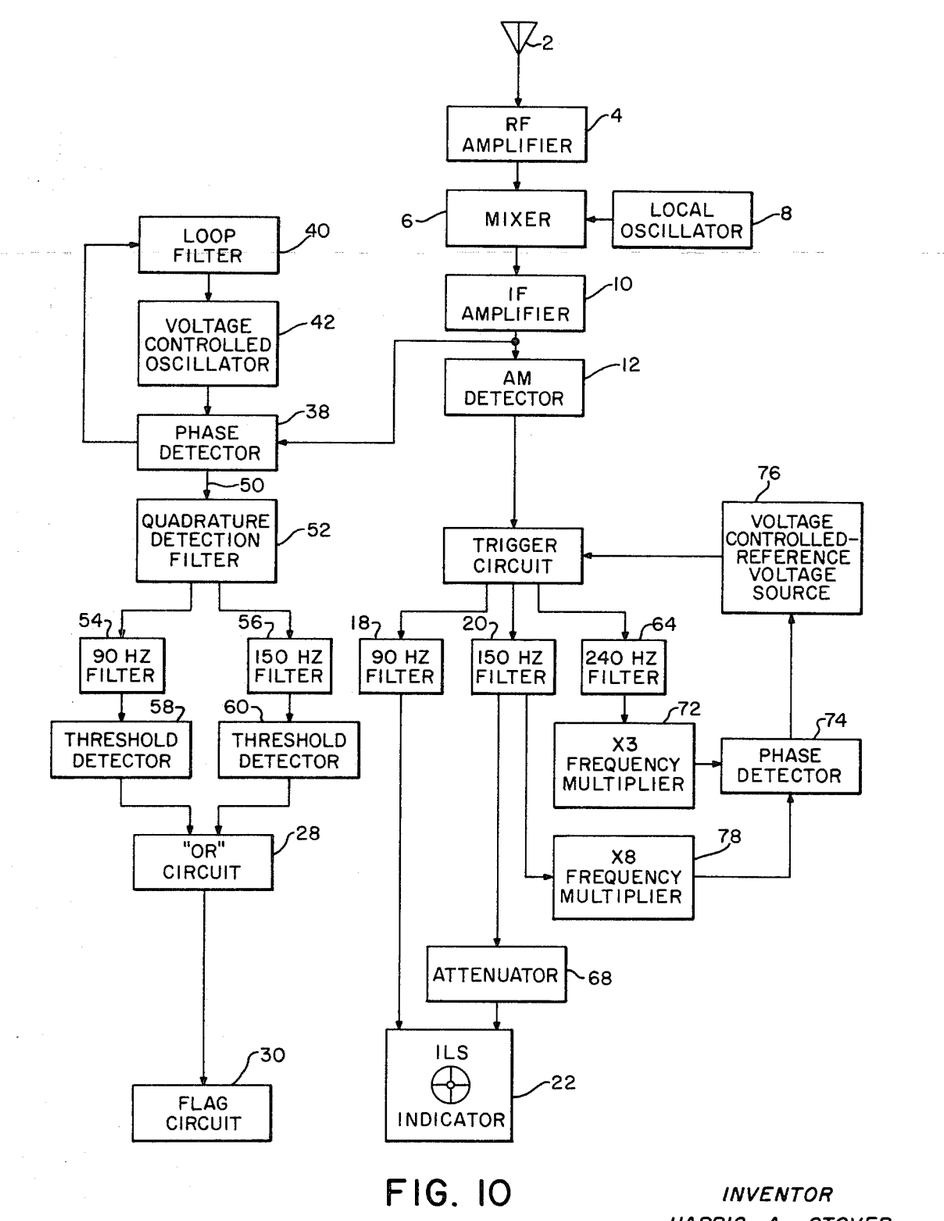

The system of FIG. 4 is thus insensitive to both symmetrical and asymmetrical limiting. As in the previous discussed system, either of the frequency distortion monitoring arrangements of the embodiments of FIGS. 1 and 2 may be added to the system of FIG. 4 to provide an ILS receiver which is immune to amplitude distortion and which is provided with means for annunciating the presence of frequency distortion. As shown in FIG. 9, local oscillator 8 in FIG. 4 might be frequency modulated at a frequency $\omega_m$ and filters provided at the output of trigger circuit 70 to detect the presence of $\omega_m$ and 2 $\omega_m$ components and operate a flag circuit when frequency distortion of a predetermined magnitude is present in the system. Alternatively, as shown in FIG. 10, means for detecting quadrature signal components, including a phase-locked loop, may be embodied to detect frequency distortion.

It should be noted that in the system of FIG. 4 the 240 Hz filter 64 may alternatively be any even harmonic of the basic 30 Hz signal in the system. For example, filter 64 might be a 60 Hz filter, in which case multipliers 72 and 78 would multiply as appropriate to arrive at a common output frequency for application to phase detector 74. In general, the scheme involves choosing filter 64 as an even harmonic filter the signal output of which reverses phase when the zero crossing level of the input to trigger circuit 70 goes above and below zero. Either of the 150 Hz or 90 Hz filter outputs may be selected, it being realized that appropriate multiplication is introduced by multipliers 72 and 78 to arrive at common frequency signals for application to phase detector 74. For example, filter 64 might be a 60 Hz filter and the frequency multiplier 72 be made to multiply by 3, while the input to frequency multiplier 78 may come from the 90 Hz filter 18 and the frequency multiplier 78 be made to multiply by a factor of 2, resulting in a circuit of equivalent operation with the phase detector 74 operating at 180 Hz rather than the above described 1,200 Hz operation.

The present invention is thus seen to provide improvements in ILS receivers by means for detecting and annunciating the presence of previously undetected sources of receiver error and in the provision for receiver modifications by means of which immunity to certain of these heretofore undetected errors is realized.

Although the techniques of the present invention have been discussed with reference to specific frequencies and to specific numbers of filters, it is obvious that other frequencies or combinations of frequencies and other numbers of filters might be employed. Also, other variations and combinations of the concepts could be used. Thus, although the invention has been described with respect to particular embodiments thereof, i is not to be so limited as changes might be made therein which fall within the scope of the invention as defined in the appended claims.

I claim:

1. In a radio receiver system of the type separably recovering first and second tonal modulations on a received carrier, said tonal modulations comprising different odd harmonics of a basic tone frequency, said receiver comprising means for converting said received carrier to an intermediate frequency and demodulation means receiving said intermediate frequency and recovering therefrom said tonal modulations; means for detecting the presence of signal amplitude limiting in said receiver, said means for detecting comprising frequency selective means receiving the output from said demodulation means and being responsive to pass a predetermined odd harmonic frequency component of said basic tone frequency, including said basic tone frequency and exclusive of said tonal modulation odd harmonics, and annunciating means receiving the output of said frequency selective means and being responsive thereto.

2. A system as defined in claim 1 wherein said demodulating means comprises an amplitude modulation detector, and said frequency selective means comprises a bandpass filter.

3. A system as defined in claim 1 wherein said demodulating means comprises a synchronous detector including an oscillator, a loop filter, and a phase detector embodied in a phase-locked loop, whereby said oscillator is locked 90° out of phase with said intermediate frequency signal carrier component, and phase detecting means responsive to the in-phase component of said oscillator signal to recover said first and second tonal modulations, said means for detecting the presence of signal limiting receiving the output from said in-phase detecting means.

4. A system as defined in claim 3 further comprising means connected to the phase detector in said phase-locked loop to detect the presence of quadrature phase tonal modulation signal components, a further frequency selective means responsive to said quadrature signal components, and said annunciating means connected to and being additionally responsive to the output from said further frequency selective means.

5. A system as defined in claim 1 wherein said means for converting said received carrier signal to an intermediate frequency comprises a local oscillator, mixing means receiving said received signal and the output from said local oscillator, the output from said mixing means comprising said intermediate frequency signal; said system further comprising means for frequency modulating said local oscillator by a frequency $\omega_m$, further frequency selective means receiving the output from said demodulator means and being responsive to pass at least one of frequency components present in said demodulator means output corresponding to $\omega_m$ and 2 $\omega_m$, and said annunciating means additionally receiving and being responsive to the output from said further frequency selective means.

6. In a radio receiver system of the type separably recovering first and second tonal modulations on a received carrier, said tonal modulations comprising different odd harmonics of a basic tone frequency, said receiver comprising means for converting said received carrier to an intermediate frequency and demodulation means receiving said intermediate frequency and recovering therefrom said tonal modulations; means for rendering said receiver immune from output signal distortion stemming from symmetrical limiting occurring in said receiver, comprising signal hard limiting means receiving the output from said demodulator means, said signal hard limiting means developing a first polarity output of predetermined magnitude when the magnitude of the signal applied thereto exceeds the mean thereof, said signal hard limiting means developing an opposite polarity output of said predetermined magnitude when the magnitude of the signal applied thereto is less than the mean thereof, first and second frequency selective means receiving the output of said signal hard limiting means and respectively passing signal components as defined by said first and second tonal modulation signals, signal attenuating means receiving the output of that one of said frequency selective means passing the higher order harmonic one of said tonal modulation signals, whereby the amplitudes of the first one and attenuated second one of said tonal modulation signals are insensitive to symmetrical limiting occurring within said receiver.

7. A system as defined in claim 6 comprising further frequency selective means receiving the output of said signal hard limiting means and passing a signal component present therein corresponding to a predetermined harmonic of said basic tone frequency including said basic tone frequency and exclusive of said first and second tonal modulation harmonics thereof, and annunciating means receiving the output of said further frequency selected means and being activated thereby.

8. A system as defined in claim 7 wherein said means for converting said received signal to an intermediate frequency comprises a local oscillator, mixing means receiving said received signal and the output from said local oscillator, the output from said mixing means comprising said intermediate frequency signal; said system further comprising means for frequency modulating said local oscillator by a frequency $\omega_m$, further frequency selective means receiving the output from said signal hard limiting means and being responsive to pass at least one of frequency components present in said signal hard limiting means output corresponding to $\omega_m$ and $2\omega_m$, respectively, said annunciating means additionally receiving and being responsive to the output from said further frequency selective means.

9. A system as defined in claim 7 further comprising a synchronous detector receiving said intermediate frequency signal, said synchronous detector including an oscillator, a loop filter and a phase detector embodied in a phase-locked loop whereby said oscillator is locked 90° out of phase with said intermediate frequency signal carrier component, and means connected to the phase detector in said phase-locked loop to detect the presence of quadrature-phase tonal modulation signal components, further frequency selected means responsive to said quadrature signal components, and said annunciating means being connected to and additionally responsive to the output from said further frequency selective means.

10. A system as defined in claim 6 further comprising a synchronous detector receiving said intermediate frequency signal, said synchronous detector including an oscillator, a loop filter and a phase detector embodied in a phase-locked loop whereby said oscillator is locked 90° out of phase with said intermediate frequency signal carrier component, and means connected to the phase detector in said phase-locked loop to detect the presence of quadrature-phase tonal modulation signal components, further frequency selected means responsive to said quadrature signal components, and said annunciating means being connected to and additionally responsive to the output from said further frequency selective means.

11. A system as defined in claim 6 wherein said means for converting said received carrier signal to an intermediate frequency comprises a local oscillator, mixing means receiving said received signal and the output from said local oscillator, the output from said mixing means comprising said intermediate frequency signal; said system further comprising means for frequency modulating said local oscillator by a frequency $\omega_m$, further frequency selective means receiving the output from said signal hard limiting means and being responsive to pass at least one of frequency components present in said signal hard limiting means output corresponding to $\omega_m$ and $2\omega_m$, and annunciating means receiving the output from said further frequency selective means and being responsive thereto.

12. In a radio receiving system of the type separably recovering first and second tonal modulations on a received carrier, said tonal modulations comprising different odd harmonics of a basic tone frequency, said receiver comprising means for converting said received carrier to an intermediate frequency and amplitude detection means receiving said intermediate frequency and recovering therefrom said tonal modulations; means for rendering said receiver immune from output signal distortions stemming from signal amplitude limiting occurring in said receiver, comprising a bistable trigger circuit receiving the output from said amplitude modulation detector, said trigger circuit developing a first polarity output of predetermined magnitude when the magnitude of the signal applied thereto exceeds the mean thereof, said trigger circuit developing an opposite polarity output of said predetermined magnitude when the magnitude of the signal applied thereto is less than the mean thereof, control means for adjusting the switching level of said trigger circuit to the zero mean of the original undistorted input signal which would have been applied to said trigger circuit in the absence of any distortion, first and second frequency selective means receiving the output of said trigger circuit and passing signal components present therein corresponding respectively to said first and second tonal modulation signals, signal attenuating means receiving the output of that one of said frequency selective means passing the higher order harmonic one of said tonal modulation signals, whereby the amplitude of the first one and attenuated second one of said tonal modulation signals are insensitive to both symmetrical and asymmetrical limiting occurring within said receiver.

13. A system as defined in claim 12 wherein said control means for adjusting the switching level of said trigger circuit as the zero mean of the undistorted signal which would be applied thereto in the absence of distortion comprises a voltage controlled reference voltage source, a phase detector, further frequency selective means passing a predetermined even harmonic frequency component of the output of said trigger circuit, a first frequency multiplying means multiplying the output from said even harmonic frequency selective means, a second frequency multiplying means receiving the output from one of said first and second frequency selective means and multiplying the output therefrom, said first and second multiplying means being adapted to multiply the respective input signals thereto by predetermined factors to produce common frequency output signals, the outputs from said frequency multipliers being applied as respective inputs to said phase detector, the output of said phase detector being applied to and controlling the output level of said voltage controlled reference voltage source, and the output from said voltage controlled reference source being applied to and adjusting the trigger level of said trigger circuit.

14. A system as defined in claim 13 wherein said means for converting said received carrier to an intermediate frequency comprises a local oscillator, mixing means receiving said received signal and the output from said local oscillator, the output from said mixing means comprising said intermediate frequency signal; said system further comprising means for frequency modulating said local oscillator by a frequency $\omega_m$, further frequency selective means receiving the output from said trigger circuit band being responsive to pass at least one of frequency components present in said trigger circuit output corresponding to $\omega_m$ and $2\omega_m$, and annunciating means receiving the output from said further frequency selective means and being activated thereby.

15. A system as defined in claim 13 further comprising a synchronous detector receiving said intermediate frequency signal, said synchronous detector including an oscillator, a loop filter and a phase detector embodied in a phase-locked loop whereby said oscillator is locked 90° out of phase with said intermediate frequency signal carrier component, means connected to the phase detector in said phase-locked loop to detect the presence of quadrature-phase tonal modulation signal components, further frequency selective means responsive to said quadrature signal components, and said annunciator means being connected to and responsive to the output from said further frequency selective means.

16. A system as defined in claim 12 further comprising a synchronous detector receiving said intermediate frequency signal, said synchronous detector including an oscillator, a loop filter and a phase detector embodied in a phase-locked loop whereby said oscillator is locked 90° out of phase with said intermediate frequency signal carrier component, means connected to the phase detector in said phase-locked loop to detect the presence of quadrature-phase tonal modulation signal components, further frequency selective means responsive to said quadrature signal components, and said annunciator means being connected to and responsive to the output from said further frequency selective means.

17. A system as defined in claim 12 wherein said means for converting said received carrier to an intermediate frequency comprises a local oscillator, mixing means receiving said received signal and the output from said local oscillator, the output from said mixing means comprising said intermediate frequency signal; said system further comprising means for frequency modulating said local oscillator by a frequency $\omega_m$, further frequency selective means receiving the output from said trigger circuit and being responsive to pass at least one of frequency components present in said trigger circuit output corresponding to $\omega_m$ and $2\omega_m$, and annunciating means receiving the output from said further frequency selective means and being activated thereby.

18. In a radio receiver system of the type separably recovering first and second tonal modulations on a received carrier, said tonal modulations comprising different ones of odd harmonics of a basic tone frequency, said receiver comprising a local oscillator, signal mixing means, said signal mixing means receiving the output from said local oscillator and said received signal and developing an intermediate frequency, output signal demodulator means receiving said intermediate frequency and recovering therefrom said tonal modulations; means for detecting the presence of non-linear signal amplification as a function of frequency in said receiver, said means for detecting comprising means for frequency modulating said local oscillator by a frequency $\omega_m$, frequency selective means receiving the output from said demodulator means and being responsive to pass at least one of frequency components present in said demodulator means output corresponding to $\omega_m$ and $2\omega_m$, and annunciating means connected to the output of said frequency selective means and being activated in response thereto.

19. In a radio receiver system of the type separably recovering first and second tonal modulations on a received carrier, said tonal modulations comprising different odd harmonics of a basic tone frequency, said receiver comprising means for converting said received carrier to an intermediate frequency and including demodulation means receiving said intermediate frequency and recovering therefrom said tonal modulations; means for detecting the presence of non-linear signal amplification as a function of frequency in said receiver, said demodulation means comprising a synchronous detection means including an oscillator, a loop filter and a phase detector collectively comprising a phase-locked loop whereby said oscillator is locked 90° out of phase with said intermediate frequency signal carrier component, phase detecting means responsive to in-phase modulation components to recover said first and second tonal modulation components, means connected to the phase detector in said phase-locked loop to detect the presence of quadrature-phase tonal modulation signal components, frequency selective means responsive to said quadrature signal components, and annunciating means connected to the output from said frequency selective means and activated in response to output signals from said frequency selective means.

* * * * *